Aug. 29, 1961    J. L. W. JACOBSEN    2,997,920
ANAMORPHOTIC OBJECTIVE SYSTEM
Filed March 10, 1958
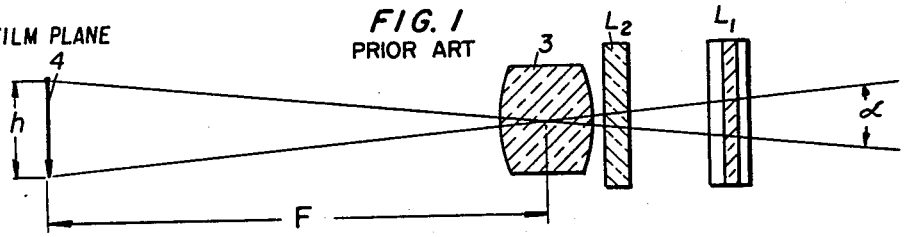
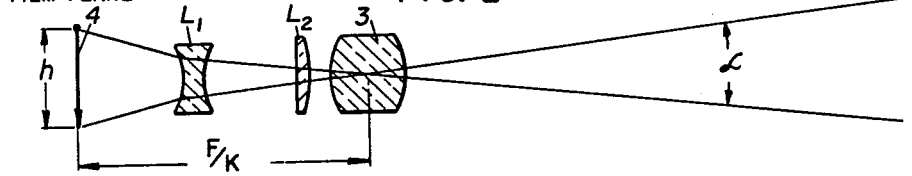
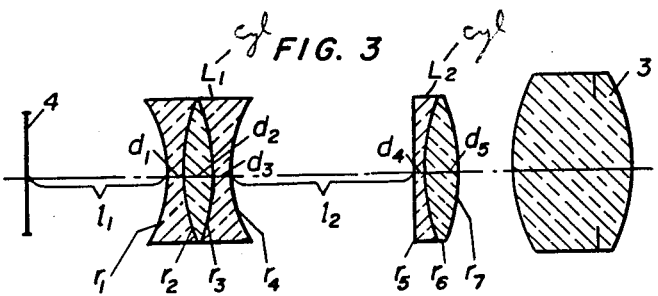
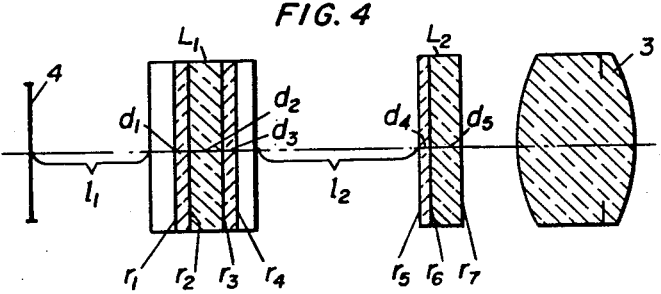
INVENTOR
JAN LOUIS WULFF JACOBSEN
BY
ATTORNEY 2,997,920
ANAMORPHOTIC OBJECTIVE SYSTEM
Jan Louis Wulff Jacobsen, Asamstrasse 8,
Munich 9, Germany
Filed Mar. 10, 1958, Ser. No. 720,367
Claims priority, application Germany Apr. 15, 1957
2 Claims. (Cl. 88—57)

The present invention relates to an anamorphotic cylindrical lens system which is set up in the path of rays of a spherical camera objective lens on the side of the shorter distance between back lens and film plane. In the prior art, anamorphic objectives are used in taking and projecting motion pictures to create a panoramic effect on the screen. During filming with such a system, the scene is recorded horizontally compressed on the film.

During projection, a horizontal expanding anamorphoser is employed to recreate the photographed scene in its original proportions. By means of this taking and projecting technique it becomes possible to store scenes of larger than conventional aspect ratio on conventional film frames.

The conventional anamorphic objective lens systems usually comprise a commercially available optical lens which is rotationally symmetrical, and an anamorphoser positioned on the opposite side of said optical lens from the film plane. This anamorphoser comprises an afocal combination of positive and negative cylindrical lenses. The function of the anamorphoser is to predeterminedly compress all lengths in the horizontal direction of the scene being photographed in the same ratio, the compression ratio, to all lengths in the vertical direction.

There are several limitations to the resolving power of such anamorphic systems, especially when combined with objective lenses of longer focal length, most conspicuous in telephoto lenses. Moreover the conventional front positioned anamorphic attachments to tele-lenses require an excessively large housing, invariably causing the need of an optical bench support. Moreover, to obtain focus for different camera-object distances, it is necessary simultaneously to change the distance between the elements of the anamorphoser as well as adjusting the spherical objective along the optical axis.

The change in position of the elements of the anamorphoser also leads to a variation of the compression factor, noticeable in projection where the expanding ratio is constant.

The present invention obviates this latter disadvantage, i.e., change in compression factor, by positioning in front of the anamorphoser a rotationally symmetrical double-lens system which has at least one variable air distance, which may be adjusted in connection with an anamorphic lens system including anamorphoser and objective lens both preset to infinity, so that it will focus an object at a finite distance on the plane of the film. This expedient, however, only increases the length and the weight of the objective to such an extent that in the case of tele-objectives such a solution is manifestly impractical, or the range of the resulting anamorphic telephoto system is limited.

It is therefore an object of the invention to provide means for removing the above outlined disadvantages of anamorphic objectives of the prior art. According to the invention, this is accomplished by introducing between the spherical objective lens and the film plane a vertical expanding and with respect to the film plane afocal anamorphoser comprising respectively a negative cylindrical lens component adjacent to the film plane and a positive cylindrical lens component axially air separated with their cylindrical axes parallel to each other and horizontally disposed.

The invention is based on the fact that the effect of a horizontal compression may be obtained by a vertical expansion. The image such formed on the film, being vertically expanded, to the degree of the standardized compression factor, will when reproduced by the usual horizontally expanding projecting system get the original relative dimensions of the object restored on the screen. By the conventional front positioned anamorphoser (cylindrical axes vertical) the focal length of the system in the horizontal plane is divided by the compression factor, i.e., the picture angle is multiplied by the same factor. In the case of the invention, however, the focal length of the system in the horizontal plane is identical with the focal length of the spherical objective lens, whereas in the vertical plane the focal length of the system, due to the rear positioned, vertical expanding anamorphoser, is increased, i.e., the focal length of the spherical lens multiplied by the compression factor. Thus by utilizing a system in accordance with the invention with an anamorphic factor of 2, a spherical objective lens of only one half of the focal length of the one used by the conventional systems is required to obtain the same picture angle. Or, vice versa, if the same focal length of the objective lens is used with both systems, the system according to the invention will have half the picture angle compared to the other, i.e., the telescopic effect is doubled—provided the anamorphic factor remains 2.

The anamorphic system described in this application has principally three main advantages compared to known anamorphic objectives of longer focal length:

(1) A considerable reduction in size and weight of the complete system.

(2) The simplified method of focussing, by adjusting the spherical objective only, the elements of the anamorphoser remaining in fixed positions.

(3) Increase of definition by distributing the causes of optical errors partly to the horizontal image in taking, and partly to the vertical image in projecting.

In all known anamorphic systems comprising cylindrical lenses, either in front of the objective lens or on both sides, at least one of the cylindrical elements must be made movable along the optical axis for focussing. The only known exception where all cylindrical elements can remain in fixed positions is when, as described, a variable collimating lens combination of at least two spherical lenses is placed in front of the whole anamorphic system. The other exception is represented by the present invention, where the anamorphoser is made afocal with respect to the film plane and the cylindrical elements kept in fixed distances from the film plane. It has no influence on the focussing of the image whether different focal length objective lenses are used in front of this anamorphoser, or whether they are focused on infinity or on finite objects. The only focussing necessary is carried out by adjusting the spherical objective only. This is particularly valuable for long-focus anamorphic work where, due to less depth of field sharpness, the adjustment of the focussing correspondence between the anamorphoser and the objective lens becomes very sensitive. According to the invention this correspondence is predetermined. Furthermore, the compression factor remains constant at all times, and allows the anamorphic system to be used down to extremely short object distances.

The image formed on the film is being expanded vertically to the degree of the standardized compression factor, and when reproduced by a horizontally expanding projecting system, the original relative dimensions of the object are restored. According to the invention, the anamorphosing action of the rear positioned expanding anamorphoser (horizontal generatrices of cylindrical surfaces) only influences the horizontal image (horizontal lines of distorted picture), whereas the definition of the vertical image is dependent on the highly corrected spherical objective only. By this expedient the optical inaccuracies introduced by the anamorphoser are limited to the horizontal image.

By the conventional method of using a front positioned anamorphoser in connection with a spherical objective, the problem of how to correct such a system for the high degree of definition required increases as the focal length of the spherical objective increases. As the anamorphoser invariably is a horizontal compressing one, it will reduce the definition of the vertical image. By reproduction of filmed pictures in this conventional manner with a horizontally expanding anamorphoser the vertical image once more is subject to additional optical errors. Moreover, during the photographing introduced inaccuracies will get greater magnification in projection, due to the horizontal expanding action of the reproduction system.

The object of the invention is therefore an anamorphotic system for photographing pictures, that are reproduced in a horizontally expanding anamorphotic projecting objective, comprising between a spherical objective lens and a film plane a vertical expanding and with respect to the film plane a focal anamorphoser comprising respectively a negative cylindrical lens component adjacent to the film plane and a positive cylindrical lens component axially air separated with their cylindrical axes parallel to each other and horizontally disposed, and said anamorphoser having such a focal length as to cause a vertical expansion corresponding to the desired compression factor. In a preferred embodiment of the invention said lens components of said anamorphoser are spaced in a fixed position from the film plane.

The object of the invention will become fully understood with reference to the following description and accompanying drawings in which:

FIG. 1 is a vertical cross sectional view of an anamorphic optical system of the prior art.

FIG. 2 and FIG. 3 in elevation are vertical cross sectional views of a preferred embodiment of the invention; and FIG. 4 is a horizontal cross section of the embodiment of FIG. 3.

In the FIGURES $L_1$, $L_2$ is the anamorphoser, 3 is the optical objective and 4 the film plane. FIG. 2 in comparison with FIG. 1 shows that only a focal length of $F/K$ is required to obtain the same picture angle by using the new rear positioned vertical expanding anamorphoser. In FIG. 1 optical objective 3 is located between anamorphoser $L_1$, $L_2$ and film plane 4. In accordance with the invention as shown in FIGS. 2, 3 and 4 the anamorphoser $L_1$, $L_2$ composed of negative and positive cylinder lenses is positioned between optical objective 3 and film plane 4 and thus causes a picture expansion in a vertical direction, the axes of the cylindrical lenses being horizontal. The symmetrical axes of the cylindrical axes are parallel, and the positive cylindrical lens adjoins the optical objective. The negative cylindrical lens is located as closely as possible to the film plane 4.

In this system for vertical expansion, i.e., where the axes of the cylindrical lenses is horizontally disposed, typical values of the optical parameters are given below with reference to the elements illustrated in FIGS. 3 and 4.

Example

| Component | Radii | Thicknesses and Distances | $n_d$ | V | $\Delta n/r$ |
| --- | --- | --- | --- | --- | --- |
| | | $l_1=67.0$ | | | |
| | $r_1=-22.5$ | | 1.52 | 60.2 | +0.0231 |
| | | $d_1=2.0$ | | | |
| | $r_2=+56.0$ | | 1.67 | 32.5 | +0.0027 |
| $L_1$ | | $d_2=6.0$ | | | |
| | $r_3=-56.0$ | | 1.52 | 60.2 | +0.0027 |
| | | $d_3=2.5$ | | | |
| | $r_4=+43.0$ | | | | +0.0121 |
| | | $l_2=92.0$ | | | |
| | $r_5=\infty$ | | | | 0 |
| | | $d_4=2.5$ | | | |
| $L_2$ | $r_6=+172.0$ | | 1.62 | 36.0 | +0.0006 |
| | | $d_5=5.0$ | | | |
| | $r_7=-172.0$ | | 1.52 | 60.2 | +0.0030 |

The values for $r$, $d$ and $l$ are in mm. and the values for $\Delta n/r$ are $$\frac{l}{mm.}$$

$r$ being the radii of the individual lens surfaces, $l$ the air separations, $d$ the lens thicknesses, $n_d$ the refractive indices and V the Abbe numbers, $\Delta n/r$ the power of refraction of the individual lens surfaces.

Individual focal length of the diverging component:

$$f_{L1}=+30.6$$

Individual focal length of the converging component:

$$f_{L2}=+412.0$$

Factor of anamorphotic extension in vertical cross section: 2.

The cylindrical lenses may be built in a conventional manner from a plurality of lenses of various types of glass in order to compensate for chromatic abberation, as well as tangential curvature.

The focusing of the overall system of the present invention is accomplished simply by adjusting the optical objective 3, while the precomputed anamorphoser 1, 2 remains fixed. This is possible because the anamorphoser is always focused on film plane 4 at a constant distance. Thus it is possible to adjust the focus of the optical objective in a simple manner by using, for instance, worm gears, or similar means. During focusing on objects at close range, no changes in the compression factor occur since in this system the relation of the anamorphoser to the film is not altered.

Since the anamorphoser-film plane distance amounts to only a few centimeters it is necessary to precompute this distance in the anamorphotic objective structure, in order to obtain the desired compression factor. While the known front-positioned anamorphoser, when adjusted to infinity, has a focal length relationship between the front and the rear lenses, which is equal to the compression factor, the anamorphoser of the present invention, located between the photographic objective and the plane of the film, however necessitates a considerably greater difference between the focal lengths of the two cylindrical lenses. In the example shown, the relation of the focal length for a compression factor of 1:2 is approximately 34:3.

Since, in accordance with the invention, it is possible to obtain the desired anamorphotic focal length by use of a photographic objective of ½ the conventional focal length, and since the anamorphoser also will become substantially smaller and is positioned in the back of the main objective housing, it is possible to reduce the total weight of this system to about one-tenth to one-twentieth of the conventional systems. In accordance with the invention, also the quality of the picture is improved. It is necessary to take into account certain of the unavoidable defects in cylindrical lenses. In addition thereto there are also optical deficiencies. These deficiencies influence the quality of the picture considerably more when front positioned anamorphosers are utilized, and to a greater extent when used in connection with tele-lenses of longer focal length. This goes to such extremes that up to the present it has not proved advisable to use focal lengths in excess of 300 millimeters—in particular with relatively large aperture values. In the system of the present invention, the quality of the picture, contrary to the above, however, depends mainly on the quality of the spherical objective and even improves with objectives of longer focal length.

The invention is not limited to the embodiment of the objective shown and described herein.

By providing means for extreme extension for the taking lens it is possible also to use the system as a magnifying objective at a close range cut down up to twice the focal length, the compression ratio remaining constant. Also a projector system may be built in the same manner in accordance with this invention.

The application does not limit itself to the disclosure of a projection system having a long vertical dimension. The only limitation to a system of the present invention is that the axes of symmetry of the cylindrical lenses be parallel and perpendicular to the optical axis of the system.

The present specification describes examples of preferred embodiments of the invention. It is, however, intended to cover all changes and modifications of the embodiments shown, which do not depart from the spirit and scope of the invention.

What I claim is:

1. Anamorphotic system for photographing pictures on to a film plane, that are reproduced in a horizontally expanding anamorphotic projecting objective, comprising a spherical objective lens, a vertical expanding and with respect to the film plane a focal anamorphoser disposed between said spherical objective lens and said film plane, said anamorphoser comprising respectively a negative cylindrical lens component adjacent to said film plane and a positive cylindrical lens component axially air separated from said negative cylindrical lens, said lenses having cylindrical axes parallel to each other and horizontally disposed, said anamorphoser having a focal length such as to cause a vertical expansion corresponding to the desired compression factor, said negative cylindrical lens component having lenses with radii $r_1$, $r_2$ $r_3$ and $r_4$, the ratio of the powers of refraction of said lens radii being substantially +0.0231 to +0.0027 to +0.0027 to +0.0121, and said positive cylindrical lens component having lenses with radii $r_5$, $r_6$ and $r_7$ the ratio of the powers of refraction of said lens radii being substantially 0 to +0.0006 to +0.0030, said values being calculated in $$\frac{l}{mm.}$$

2. Anamorphotic system for photographing pictures on to a film plane, that are reproduced in a horizontally expanding anamorphotic projecting objective, comprising a spherical objective lens, a vertical expanding and with respect to the film plane afocal anamorphoser disposed between said spherical objective lens and said film plane, said anamorphoser comprising respectively a negative cylindrical lens component adjacent to said film plane and a positive cylindrical lens component axially air separated from said negative cylindrical lens, said lenses having cylindrical axes parallel to each other and horizontally disposed, said anamorphoser having a local length such as to cause a vertical expansion corresponding to the desired compression factor, said lens components of said anamorphoser being spaced in a fixed position from the film plane, the values of said negative cylindrical lens component ($L_1$) and said positive cylindrical lens component ($L_2$) corresponding to the following table:

| Component | Radii | Thicknesses and Distances | $n_d$ | V | $\Delta n/r$ |
|---|---|---|---|---|---|
| $L_1$ | $r_1=-22.5$ | $l_1=67.0$ | 1.52 | 60.2 | +0.0231 |
|  | $r_2=+56.0$ | $d_1=2.0$ | 1.67 | 32.5 | +0.0027 |
|  | $r_3=-56.0$ | $d_2=6.0$ | 1.52 | 60.2 | +0.0027 |
|  | $r_4=+43.0$ | $d_3=2.5$ |  |  | +0.0121 |
| $L_2$ | $r_5=\infty$ | $l_2=92.0$ |  |  | 0 |
|  | $r_6=+172.0$ | $d_4=2.5$ | 1.62 | 36.0 | +0.0006 |
|  | $r_7=-172.0$ | $d_5=5.0$ | 1.52 | 60.2 | +0.0030 | the values for $r$, $d$ and $l$ are in mm. and the values for $\Delta n/r$ are $$\frac{l}{mm.}$$

$r$ being the radii of the individual lens surfaces, $l$ the air separations, $d$ the lens thicknesses, $n_d$ the refractive indices and V the Abbé numbers, $\Delta n/r$ the power of refraction of the individual lens surfaces.

References Cited in the file of this patent

UNITED STATES PATENTS

| 1,829,634 | Chretien | Oct. 27, 1931 |
| 1,932,082 | Newcomer | Oct. 24, 1933 |
| 1,938,808 | Ceccarini | Dec. 12, 1933 |
| 1,943,172 | Ford | Jan. 9, 1934 |
| 1,962,892 | Chretien | June 12, 1934 |
| 2,006,233 | Chretien | June 25, 1935 |
| 2,017,634 | Newcomer | Oct. 15, 1935 |
| 2,428,399 | Timoney | Oct. 7, 1947 |
| 2,720,813 | Cox | Oct. 18, 1955 |
| 2,720,815 | Mellberg | Oct. 18, 1955 |
| 2,731,883 | Kohler et al. | Jan. 24, 1956 |
| 2,933,017 | Kingslake et al. | Apr. 19, 1960 |

FOREIGN PATENTS

| 8,512 | Great Britain | of 1898 |
| 416,074 | Great Britain | Sept. 10, 1934 |